Aug. 13, 1929.  E. G. REID  1,724,110
AIRCRAFT
Filed Feb. 24, 1927    3 Sheets-Sheet 1
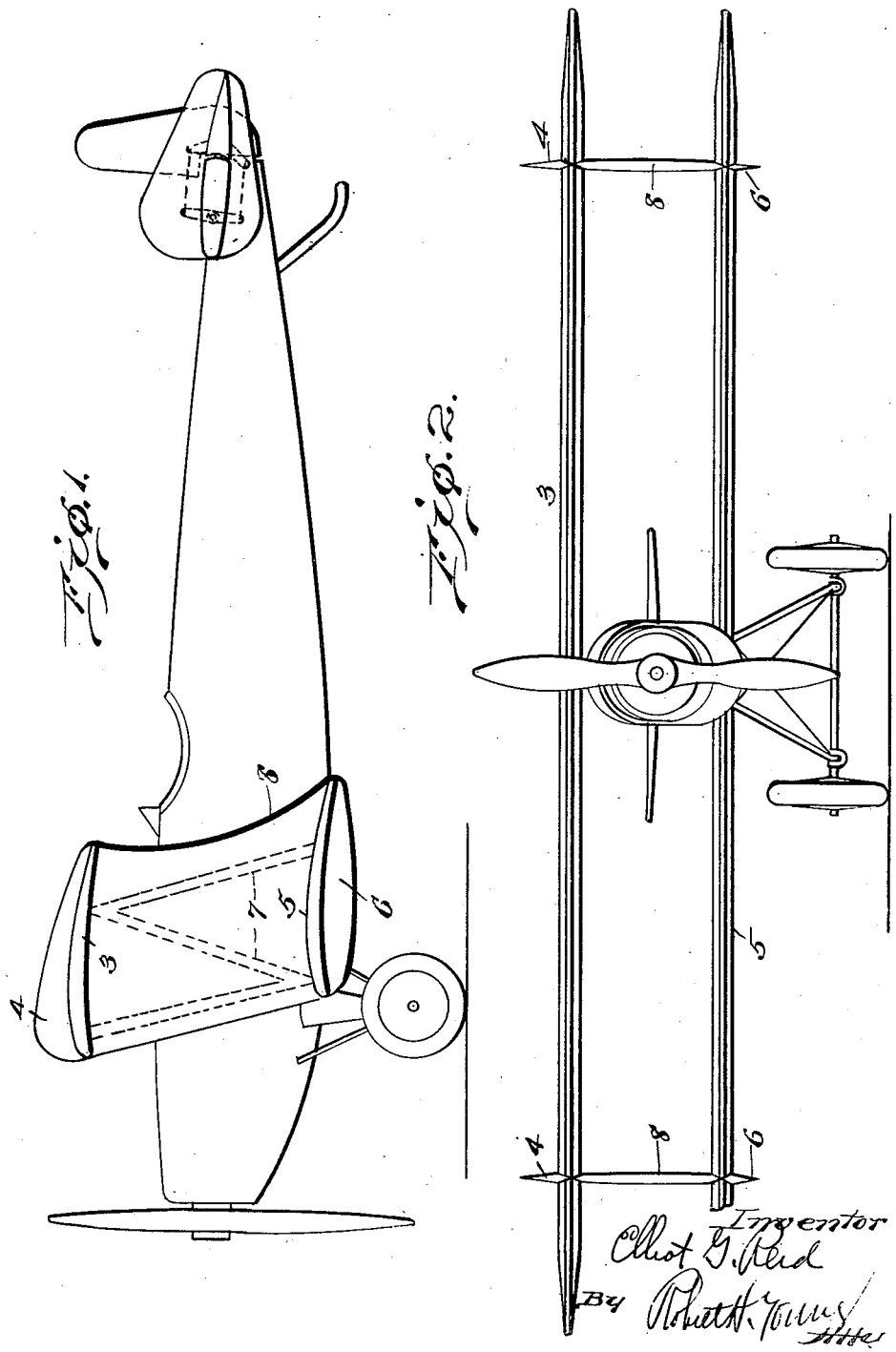

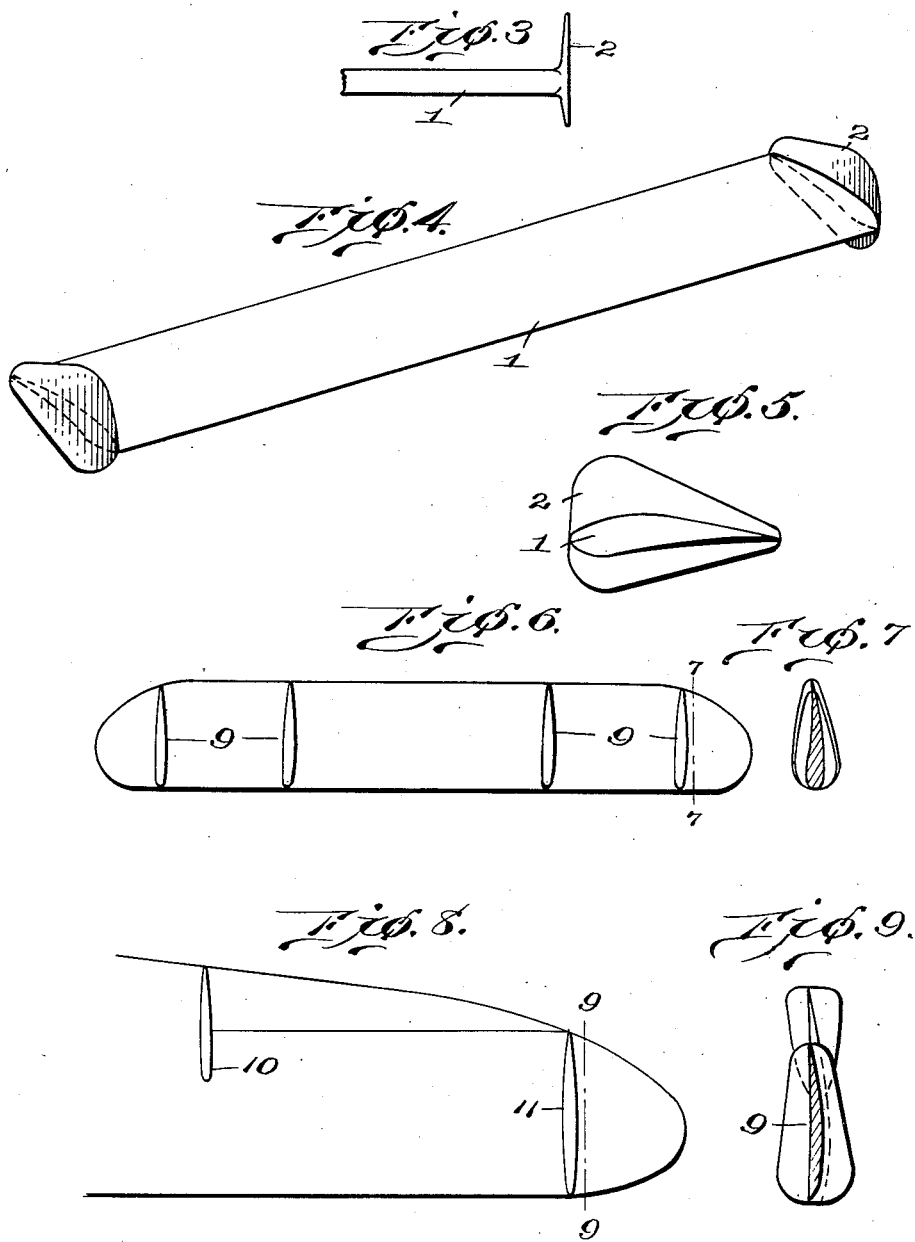

Aug. 13, 1929.   E. G. REID   1,724,110
AIRCRAFT
Filed Feb. 24, 1927   3 Sheets-Sheet 3
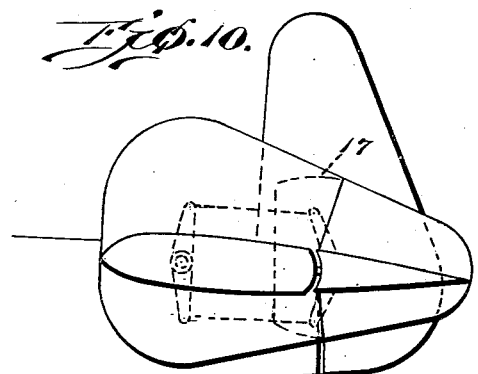
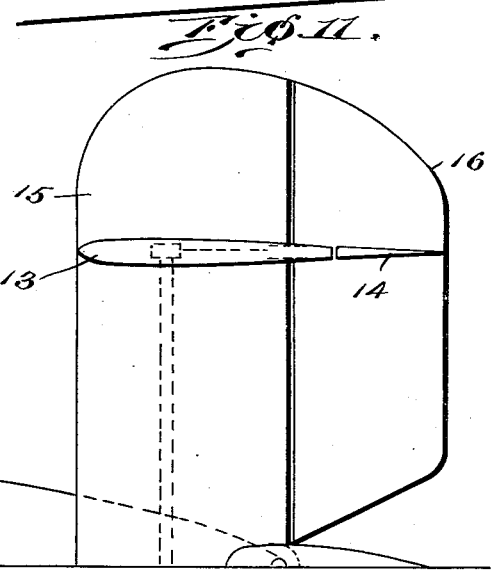
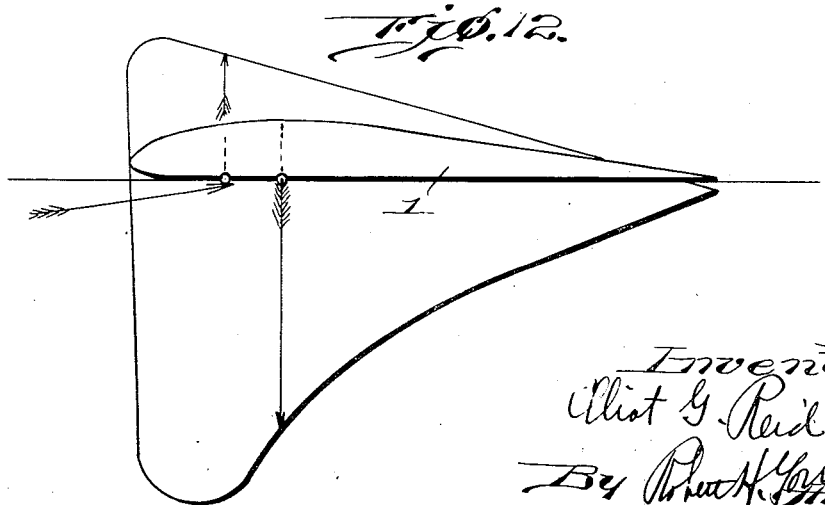
Inventor
Eliot G. Reid
By Robert H. ...

Patented Aug. 13, 1929.

1,724,110

UNITED STATES PATENT OFFICE.

ELLIOTT G. REID, OF HAMPTON, VIRGINIA.

AIRCRAFT.

Application filed February 24, 1927. Serial No. 170,708.

This invention relates in general to improvements in the design and construction of bodies, which create, by their motion through a fluid, forces having components perpendicular to the direction of motion of the body. More particularly, this invention is directed to improvements on the lifting and controlling surfaces of water and aircraft, the disclosure, for purposes of illustration, being directed to airplane wings and surfaces though it will be obvious that it is equally applicable to control surfaces on water craft.

When a body moves through a fluid and, by virtue of its shape or inclination to the direction of motion, or both, produces a force having a component perpendicular to the direction of motion, this force is the result of there being a greater average pressure on one side of the body than the other. In the case of an airplane wing this pressure difference set up by the motion of the wing through air is the source of the lift derived. The pressure on the opposite sides of the wing being unequal there is a tendency of the air from the high pressure region below the wing to flow to that of the low pressure above it. Since direct flow is obstructed by the wing itself, this equalization takes place around its boundary, the equalizing flow becoming most intense at the wing tips. The resultant up flow at the tips, coupled with the induced transverse flow feeding it, gives rise to a large proportion of the energy loss and wind resistance.

In an effort to minimize this loss designers have turned to large aspect ratios since it has been thoroughly established, theoretically and experimentally, that, the greater the span of a wing, the area being constant, the less its resistance or drag while creating lift. This result is partially due to elimination of the transverse flow and the reduction of the proportion of the wing affected by the tip flow.

Such a solution of the problem is unsatisfactory since a great span and small chord are objectionable from the standpoints of strength, stiffness, lateral inertia, and difficulty in handling and storing.

It is an object of my invention to provide fins or shields adjacent the surface tips and along the span of the surface as may be necessary to prevent air flow transversely of the surface and around the tips thereof.

It is an additional object of my invention to so design my fins or shields that the vertical dimension at any point shall be substantially proportional to the difference between the pressures on the two surfaces of the wing at that point in order that maximum shielding effect may be obtained with a given area of fin or shield.

It is a further object of my invention to construct my shields with lateral dimensions designed to present a streamlined structure to the air flow and thus reduce the drag of the surface.

Other objects of my invention will appear in the accompanying specification and claims and will be disclosed in the accompanying drawings, in which—

Fig. 1 is a side elevation of an airplane provided with my wing shields;

Fig. 2 is a front elevation of the structure shown in Fig. 1;

Fig. 3 is a front elevation of one of my shielding fins attached to a wing tip;

Fig. 4 is a perspective of a wing having my shielding fins secured thereto;

Fig. 5 is a side elevation of the structure shown in Figure 3;

Fig. 6 is a top plan view of a wing surface having a plurality of my wing fins;

Fig. 7 is a side elevation, partly in section along the line 7—7 of Fig. 6;

Fig. 8 is a modification of the structure shown in Figure 6 showing a fin positioned adjacent and inner end of the aileron;

Fig. 9 is a side elevation, partly in section along the line 9—9 of Figure 8;

Fig. 10 is a side elevation of a horizontal stabilizer equipped with my shields;

Fig. 11 is a half plan view of the same;

Fig. 12 is a diagram showing the pressures on the upper and lower surfaces of an airfoil.

Referring now with greater particularity to the drawings, and having reference first to Figures 3, 4, 5 and 12, it will be seen that I provide shields 2 secured to the tips of the wing 1. The shields 2 are streamlined from front to rear in lateral dimension and their vertical dimensions above and below the chord vary substantially in proportion with the pressure differences fore and aft. In other words, the portion of the fin above the wing will be of greater height than that below the wing since the pressure in the region above the wing is less than the pressure in the undisturbed air by an amount greater than the amount by which the pressure in the region below the wing is in excess of the still air pressure. The upper fin portion approaches trailing edge more rapidly than does the lower fin portion which, again, is in accordance with the pressure diagram shown in Figure 12 in which the ordinates of the curves indicate the magnitude of the pressures acting on the wing with reference to the pressure in the undisturbed air.

In the structure shown in Figures 1 and 2 I have disclosed a method of applying my invention to a biplane structure. In this structure the upper wing 3 has wing shield portions 4 corresponding to the upper shield portions shown in Figures 3, 4 and 5; the lower wing 5 is provided with lower wing shield portions 6 corresponding to the lower wing shield portions shown in these same figures; these shield members being mounted in the vertical plane of the interplane struts 7; and the struts 7 are encased in a streamlined casing 8, the trailing edge of which is curved as shown in Figure 1 to minimize drag.

In Figures 6 and 7 I have disclosed a structure employing a plurality of wing shields 9 disposed along a wing surface.

In Figures 8 and 9 I have disclosed a pair of wing shields disposed adjacent the ends of the ailerons, the shield 10 being of a length sufficient to prevent the spilling of air at the inner end of the aileron during its operation; and the shield 11, positioned at the outer end of the aileron extending from the entering edge to the trailing edge of the wing;

In Figures 10 and 11 I have disclosed shields 13 and 14 applied to the horizontal stabilizer 15 and elevator 16, respectively, in a manner similar to that already disclosed, a suitable extension 17 of the shields 14 being provided within a corresponding recess in the shields 13 to permit operation of the elevator and maintenance of a continuous shield.

From the foregoing it will be seen that my invention operates to prevent air flow laterally of the surfaces and around the tips thereof; and further, that the structure necessary to produce this result is designed to operate with a minimum of head resistance.

Having thus described my invention what I claim is—

1. In combination, a body designed to create by its motion through a fluid forces having components perpendicular to the direction of motion, and fins secured to said body in planes substantially perpendicular to the main cross stream dimension of the said body, said fins having portions extending above and below said body to dimensions which are at any point substantially proportional to the difference between the pressure at that point and the pressure of the undisturbed fluid.

2. In combination, a body designed to create by its motion through a fluid forces having components perpendicular to the direction of motion, and fins secured to said body in planes substantially perpendicular to the main cross stream dimension of the said body, said fins being streamlined in transverse dimensions from front to rear, said fins having portions extending above and below said body dimensions which are at any point substantially proportional to the difference between the pressure at that point and the pressure of the undisturbed fluid.

3. In combination, an airfoil and fins positioned thereon in planes perpendicular to the span of said airfoil, said fins extending above and below said airfoil to degrees substantially proportional to the variance of the differences of pressures above and below the airfoil, respectively, and the pressure of the undisturbed air.

4. In combination, an airfoil and fins positioned thereon in planes substantially perpendicular to the span of said airfoil, said fins extending above and below said airfoil to degrees substantially proportional to the variance of the differences of pressures above and below the airfoil, respectively, and the pressure of the undisturbed air, said fins being streamlined in the lateral sense throughout their length.

5. In combination, an airfoil, a control surface inset into a recess in said airfoil adjacent its trailing edge, and fins mounted on said airfoils and adjacent said control surfaces on each side thereof and in a plane perpendicular to the span thereof.

6. In combination, an airfoil, a control surface inset into a recess in said airfoil adjacent its trailing edge, and streamlined fins mounted on said airfoils and adjacent said control surfaces on each side thereof and in a plane perpendicular to the span thereof.

7. In combination, an airfoil, a control surface hingedly connected to said airfoil and adjacent, its trailing edge, and fins mounted on said airfoil adjacent said control surfaces on each side thereof and in a plane perpendicular to the span thereof.

8. In combination, an airfoil, a control surface hingedly connected to said airfoil and inset into a recess in said airfoil, and aligned fins mounted on said airfoil adjacent the opposite ends of said control surface, said fins extending in planes perpendicular to the span of said airfoil.

In testimony whereof I affix my signature.

ELLIOTT G. REID.